United States Patent [19]
Okubo

[11] Patent Number: 5,271,666
[45] Date of Patent: Dec. 21, 1993

[54] ANTI-LOCK CONTROL APPARATUS FOR AUTOMOTIVE VEHICLES

[75] Inventor: Satomi Okubo, Saitama, Japan

[73] Assignee: Akebono Brake Industry Co., Ltd., Tokyo, Japan

[21] Appl. No.: 721,403

[22] Filed: Jun. 26, 1991

[30] Foreign Application Priority Data

Jun. 29, 1990 [JP] Japan .................... 2-169863

[51] Int. Cl.$^5$ .................... B60T 8/32
[52] U.S. Cl. .................... 303/96; 303/100; 303/111; 364/426.02
[58] Field of Search .................... 303/100, 111, 113 AP, 303/DIG. 1, DIG. 2, 95, 96, 98, 103; 364/426.02

[56] References Cited

U.S. PATENT DOCUMENTS

| | | | |
|---|---|---|---|
| 3,948,569 | 4/1976 | Gentet et al. | 303/21 |
| 3,950,036 | 4/1976 | Fink et al. | 303/111 |
| 4,836,618 | 6/1989 | Wakata et al | 303/111 |
| 4,929,035 | 5/1990 | Shimanuki . | |
| 5,015,041 | 5/1991 | Kuwana et al. | 303/11 X |

FOREIGN PATENT DOCUMENTS 3733801 3/1989 Fed. Rep. of Germany .
3815732 11/1989 Fed. Rep. of Germany .
3934308 4/1991 Fed. Rep. of Germany .

Primary Examiner—Robert J. Oberleitner
Assistant Examiner—Lee W. Young
Attorney, Agent, or Firm—Cushman, Darby & Cushman

[57] ABSTRACT

In a three-channel anti-lock control apparatus in which brake hydraulic pressure for left and right rear wheels is controlled through a common control channel based on a lower wheel speed selected from left and right rear wheel speeds, a pressure increase rate only for one of the right and left wheels, which one has a higher speed than the other, is increased in a case where a speed difference between left and right rear wheel speeds is not less than a predetermined value $\Delta V$ and the common control channel is not in a pressure decrease status.

7 Claims, 5 Drawing Sheets

ANTI-LOCK CONTROL APPARATUS FOR AUTOMOTIVE VEHICLES

BACKGROUND OF THE INVENTION

The present invention relates to an anti-lock control apparatus for preventing locking of automotive wheels during braking thereof.

Generally, in an anti-lock control apparatus for automotive vehicles, to maintain steering ability and running stability during braking, a control unit including a microcomputer controls brake hydraulic pressure. This brake pressure control reduces braking distance.

During operation of the anti-lock control apparatus, a control mode for brake hydraulic pressure is determined on the basis of an electric signal indicative of a wheel speed. This wheel speed is detected by a wheel speed sensor. According to the control mode, a hold valve, which is normally opened solenoid valve, and a decay valve, which is a normally closed solenoid valve, are selectively opened and closed to increase, hold constant and decrease the brake hydraulic pressure.

In such anti-lock control apparatus, as disclosed in the U.S. Pat. No. 4,929,035, three-channel anti-lock control is widely used such that the brake hydraulic pressure for left and right front wheels is controlled to be increased and decreased on the basis of left and right wheel speeds through first and second control channels independent of each other, respectively, and the brake hydraulic pressure for left and right rear wheels is controlled to be increased and decreased on the basis of a common wheel speed which is a selected lower one from the left and right wheel speeds through a third control channel.

However, such front-independent and rear-select-low three-channel anti-lock control in which the brake hydraulic pressure for left and right wheels is controlled on the basis of a common select-low wheel speed through a common control channel, suffers from a problem in that if the vehicle moves on so-called split $\mu$ road in which the surface of the road differs in the coefficient of friction between the left and right wheels, the speed of the wheel on the higher friction coefficient part of the road surface drops more than that of the other wheel on the lower friction coefficient part of the road surface after the start of the increase in the brake hydraulic pressure. This causes the decrease in the brake hydraulic pressure to be started through the common control channel for both the left and right wheels. Therefore, the decrease in the pressure is started for the wheel on the lower friction coefficient part of the road surface before the speed of the wheel is not decreased enough. Besides, the increase in the brake hydraulic pressure for both the wheels is not started until the speed of the wheel on the higher friction coefficient part of the road surface recovers to the vicinity of the speed of the vehicle. As a result, the brake hydraulic pressure for the faster wheel on the lower friction coefficient of the road surface is likely to become insufficient.

SUMMARY OF THE INVENTION

It is an object of the present invention to provide anti-lock control method and apparatus for solving the above-mentioned problems.

In order to attain the above-noted and other objects, the present invention provides an anti-lock control system for an automotive vehicle, in which lower speed selection means for selecting lower one of wheel speeds of right and left wheels of the vehicle is provided, and brake hydraulic pressure for the right and left wheels is controlled to be increased and decreased based on the selected lower one through a common control channel, the apparatus comprising: means for calculating a speed difference between the wheel speeds; and means for changing a rate of increase in the brake hydraulic pressure for a higher rate with respect to speed-higher one of the right and left wheels in response to the case that the difference is not less than a prescribed value $\Delta V$ and the common control channel is not in a pressure decrease mode.

According to the anti-lock control system, the brake hydraulic pressure for the wheel of the higher speed is made high enough to effectively use for the right and left wheels to reduce braking distance of the vehicle.

DETAILED DESCRIPTION OF THE PREFERRED EMBODIMENTS

An embodiment of the present invention will now be described in detail with reference to the accompanying drawings.

Figure 1:
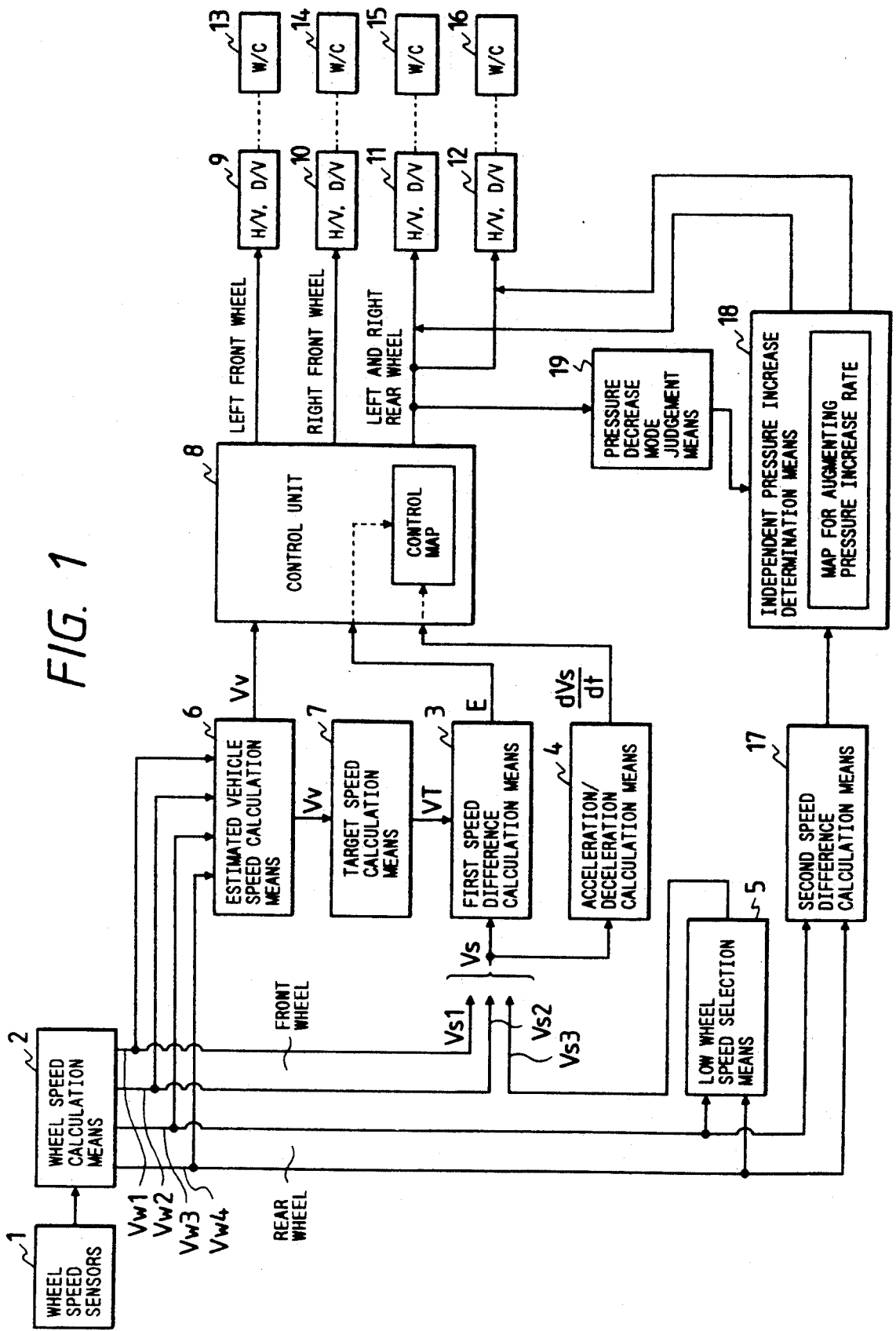
FIG. 1 is a block diagram showing an anti-lock control apparatus according to an embodiment of the present invention.

As shown in FIG. 1, an anti-lock control apparatus comprises wheel sensors 1, wheel speed calculation means 2, first speed difference calculation means 3, acceleration/deceleration calculation means 4, lower wheel speed selection means 5, estimated vehicle speed calculation means 6, target speed calculation means 7, a control unit 8, modulators 9, 10, 11 and 12, second speed difference calculation means 17, independent pressure increase determination means 18, and pressure decrease mode judgement means 19.

The wheel speed sensors are attached to the four wheels of the vehicle, respectively. The output from the sensors 1 are transmitted to the wheel speed calculation means 2 and subjected to calculations by the means so that signals indicative of speeds Vw1, Vw2, Vw3 and Vw4 of the wheels are obtained. The signals indicative of the wheel speed Vw1 for the left front wheel and of the wheel speed Vw2 for the right front wheel are directly transmitted as first and second system speeds Vs1 and Vs2, respectively, to the first speed difference calculation means 3 and the acceleration/deceleration calculation means 4. The signal indicative of the lower one of the wheel speed Vw3 for the left rear wheel and the wheel speed Vw4 for the right rear wheel is selected by the lower wheel speed selection means 5 and then transmitted as a third system speed Vs3 to the first speed difference calculation means 3 and the acceleration/deceleration calculation means 4.

The signals indicative of the wheel speeds Vw1, Vw2, Vw3 and Vw4 are transmitted to the estimated vehicle speed calculation means 6. In the estimated vehicle speed calculation means 6, the highest wheel speed is selected from among the four wheel speeds Vw1 to Vw4. The signal indicative of the selected highest wheel speed is processed through a filter for which the follow-up limits to the rates of the increase and decrease in the highest wheel speed are set at ±1G, so that a signal indicative of an estimated vehicle speed Vv approximate to the actual vehicle speed is obtained. The signal indicative of the estimated vehicle speed Vv is output to the target speed calculation means 7 and the control unit 8.

The target speed calculation means 7 calculates a target speed VT which follows up the estimated vehicle speed Vv with a prescribed speed difference therefrom. A signal indicative thereof is transmitted from the means 7 to the first speed difference calculation means 3.

Figure 2:
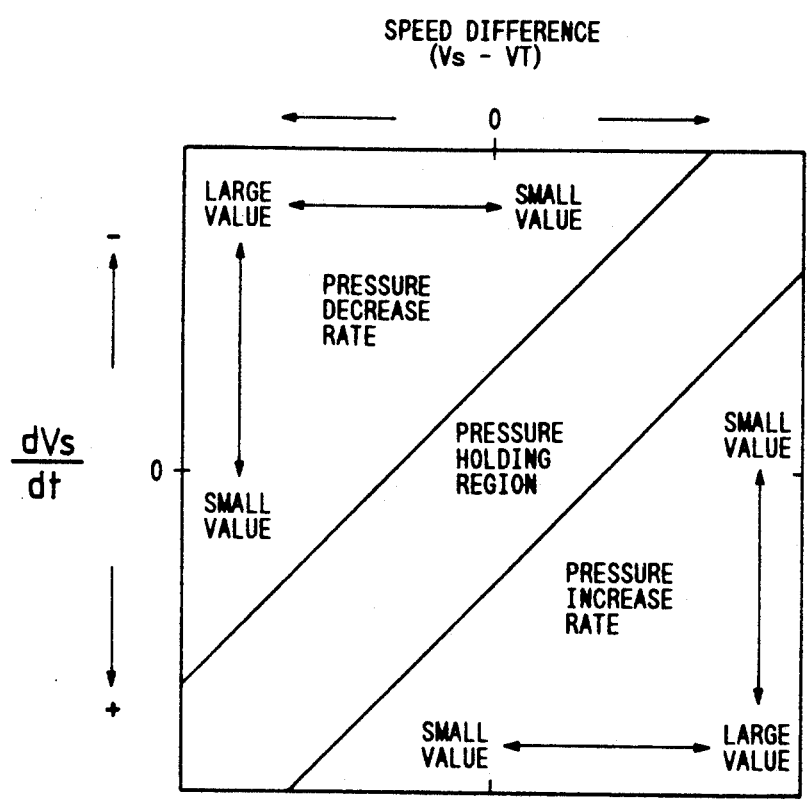
FIG. 2 shows a control map used in the anti-lock control apparatus.

The memory of the control unit 8 stores a control map shown in FIG. 2. In the control map, the difference E (which is equal to Vs–VT) between the system speed Vs and the target speed VT, which is calculated by the first speed difference calculation means 3, is shown along an axis of abscissas, and the rate dVs/dt of the increase or decrease in the system speed Vs, which is calculated by the acceleration/deceleration calculation means 4, is shown along an axis of ordinates so that the map indicates a pressure increase region, a pressure holding region and a pressure decrease region for the brake hydraulic pressure in brake cylinders 13, 14, 15 and 16 of the vehicle, and also indicates the magnitude of the rate of the increase in the brake hydraulic pressure in the pressure increase region and that of the rate of the decrease in the brake hydraulic pressure in the pressure decrease region as control values. The increase rate in the brake hydraulic pressure indicates the duty ratio of a pressure increase signal which is applied to a hold valve HV. The decrease rate in the brake hydraulic pressure indicates the duty ratio of a pressure decrease signal which is applied to a decay valve DV.

Although each of a first control channel for the left front wheel, a second control channel for the right front wheel and a third control channel for the right and left rear wheels has the first speed difference calculation means 3, the acceleration/deceleration calculation means 4 and the control unit 8, the means and the unit are shown for only one control channel in FIG. 1 to simplify the drawing.

The modulators 9, 10, 11 and 12 function to increase, hold constant and/or decrease the brake hydraulic pressure in the brake cylinders 13, 14, 15 and 16 for the automotive wheels. Each of the modulators 9, 10, 11 and 12 has the hold valve HV and the decay valve DV which are solenoid valves.

The control units 8 read the control values from the control maps in order to control the modulators 9, 10, 11 and 12 so that the hold valves HV and decay valves DV of the modulators 9 and 10 are regulated by control signals sent out from the corresponding control units on the basis of the system speed Vs1 and Vs2, but the hold valves HV and decay valves DV of the other modulators 11 and 12 are usually regulated identically to each other by a common control signal sent out from the other corresponding control unit on the basis of the system speed Vs3.

On the other hand, the signals indicating the wheel speeds Vw3 and Vw4 of the left and right rear wheels are transmitted to the second speed difference calculation means 17 by which the difference between the wheel speeds Vw3 and Vw4 is calculated so that when the difference is not less than a prescribed value ΔV, a signal indicating that the difference is not less than the value is sent from the means to the independent pressure increase determination means 18. The control signal sent out from the control unit 8 to regulate the hold valves HV and decay valves DV of the modulators 11 and 12 through the third control channel for the right and left rear wheels is applied to the pressure decrease mode judgement means 19 by which it is judged whether the control channel is in a pressure decrease mode or not. When it is judged by means 19 that the control channel is not in the pressure decrease mode, namely the channel is in a pressure increase mode or a pressure holding mode, a signal indicating the result of the judgement is sent to the independent pressure increase determination means 18 having a map for augmenting the pressure increase rate. When the signals are both applied to the independent pressure increase determination means 18 from the second speed difference calculation means 17 and the pressure decrease mode judgement means 19, a pressure increase signal depending on the pressure increase rate which is read from the map of the means 18 is sent therefrom to the third modulator 11 or fourth modulator 12, which corresponds to the faster one of the left and the right rear wheels, to control the modulator.

Figure 3:
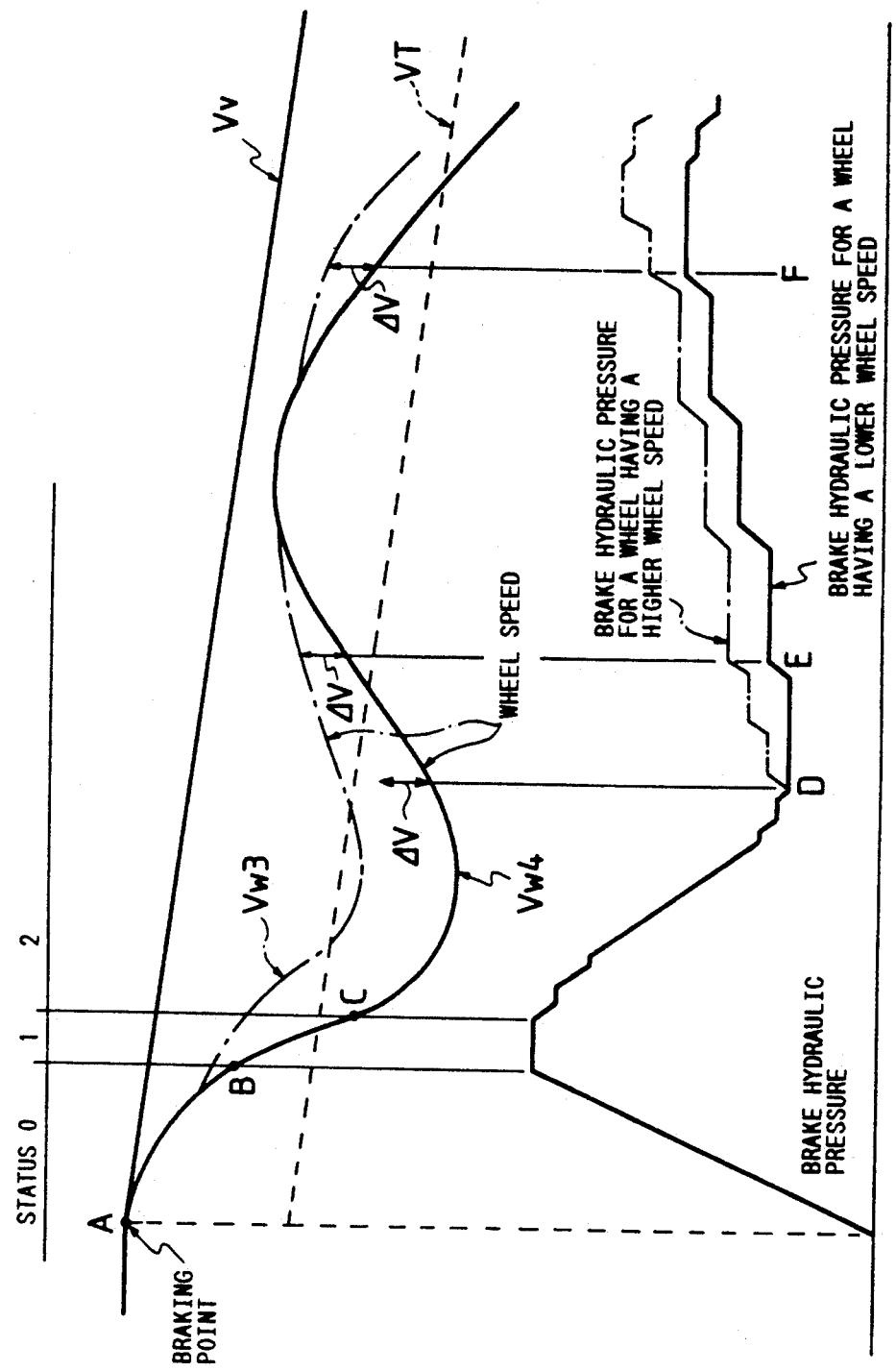
FIG. 3 is a time chart showing anti-lock control in the apparatus.
Figure 4:
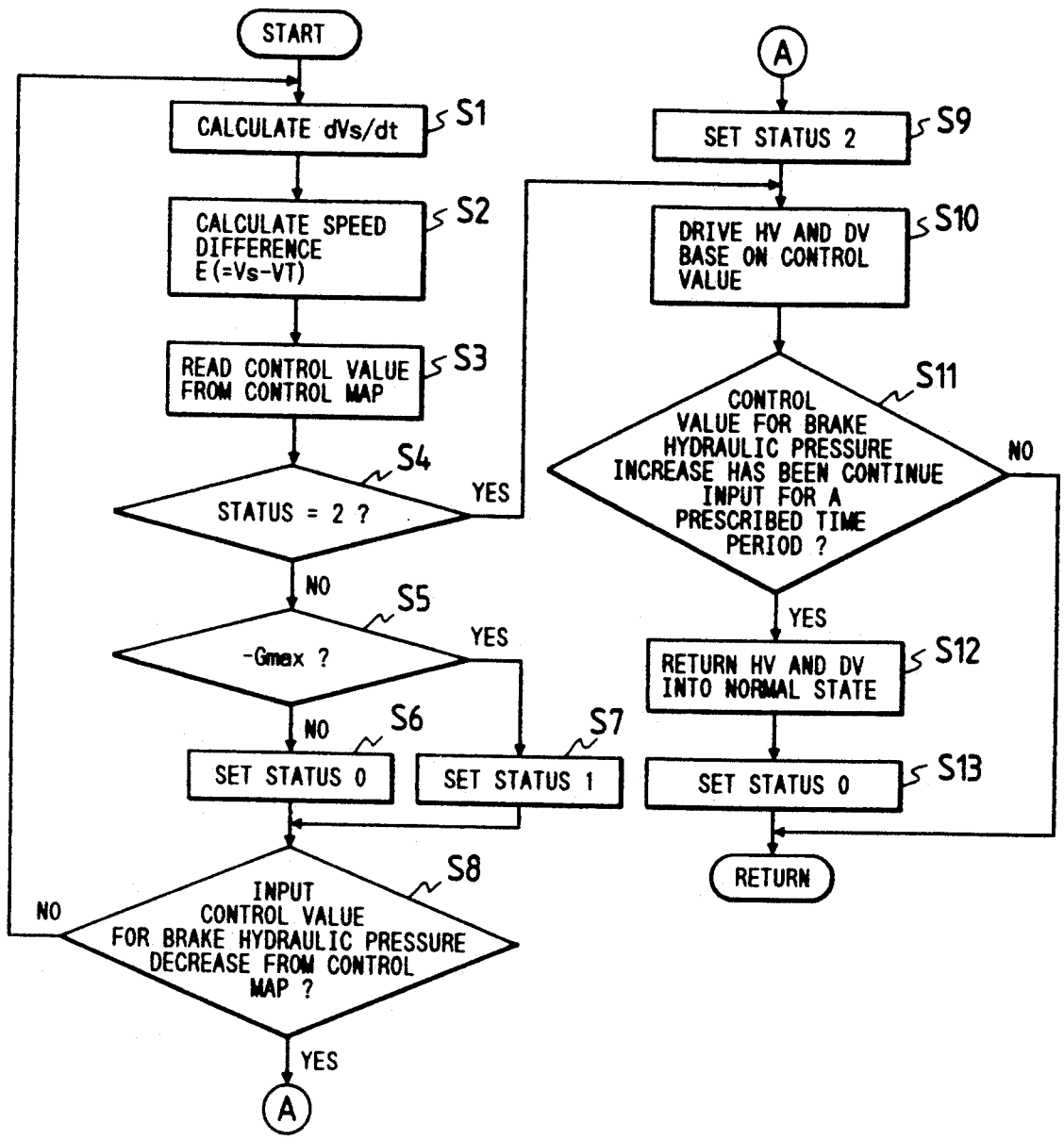
FIG. 4 is a flow chart of the control.

The operation of the anti-lock control apparatus is described with reference to FIGS. 3 and 4 from now on. FIG. 3 is a time chart of the anti-lock control of the vehicle by the apparatus. FIG. 4 is a flow chart of a part of the anti-lock control, which is performed by the control unit 8. Statuses shown in FIG. 3 are first described.

Status 0

The status 0 lasts from a time point A at which the brake pedal of the vehicle is depressed, to a time point at which the rate dVs/dt of the decrease in the channel speed is judged to have reached a prescribed level -Gmax, or a time point at which it is read from the control map of the control unit 8 that the anti-lock control is in the pressure holding region. In status 0, the hold valve HV is opened and the decay valve DV is closed so that the brake hydraulic pressure in the brake cylinder is increased by supplying the brake fluid from the master cylinder of the vehicle.

Status 1

The status 1 lasts from the time point B to a time point at which a control value for the decrease in the brake hydraulic pressure in the brake cylinder is entered from the control map. At the time point B, the hold valve HV is closed so that the brake hydraulic pressure is held constant.

Status 2

The status 2 lasts from the time point at which the control value for the decrease in the brake hydraulic pressure in the brake cylinder is entered from the control map, to a time point at which a control value for the increase in the brake hydraulic pressure has been continuously entered from the control map for a prescribed time period. In the status 2, the brake hydraulic pressure in the brake cylinder is decreased, held constant and increased, on the basis of the control values.

The part of the anti-lock control, which is performed by the control unit 8, is described with reference to FIG. 4 from now on.

In step S1, the rate dVs/dt of the increase or decrease in the system speed Vs is calculated. In step S2, the difference E (which is equal to Vs−VT) between the system speed Vs and the target speed VT is calculated. In step S3, a control value is read from the control map based on the rate dVs/dt and the difference E which are calculated in the steps S1 and S2. In step S4, is determined whether the anti-lock control has come into the status 2, namely, a control value for the decrease in the brake hydraulic pressure is entered from the control map. If the result of the determination in the step S4 is "NO", it is determined in step S5 whether the rate dVs/dt of the decrease in the system speed Vs has reached the prescribed level −Gmax. If the result of the determination in the step S5 is "NO", the status 0 is set in step S6. If the result of the determination in the step S5 is "YES", the status 1 is set in step S7 and it is then determined in step S8 whether a control value for the decrease in the brake hydraulic pressure is entered from the control map. If the result of the determination in the step S8 is "YES", the status 2 is set in step S9 and it is then performed in step S10 that a control mode is determined on the basis of the control value read from the control map, and the duty ratio of the pressure increase signal to be applied to the hold valve HV or that of the pressure decrease signal to be applied to the decay valve is determined to open or close the valve to increase, hold or decrease the brake hydraulic pressure. In step S11, it is determined whether a control value for the increase in the brake hydraulic pressure has been continuously entered from the control map for a prescribed time period. If the result of the determination in the step 11 is "NO", the step S1 is taken again. If the result of the determination in the step S11 is "YES", the hold valve HV and the decay valve DV are returned into a normal braking state which is not subjected to the anti-lock control. In that case, the hold valve is opened and the decay valve is closed in step S12, and the status 0 is set in step S13.

Figure 5:
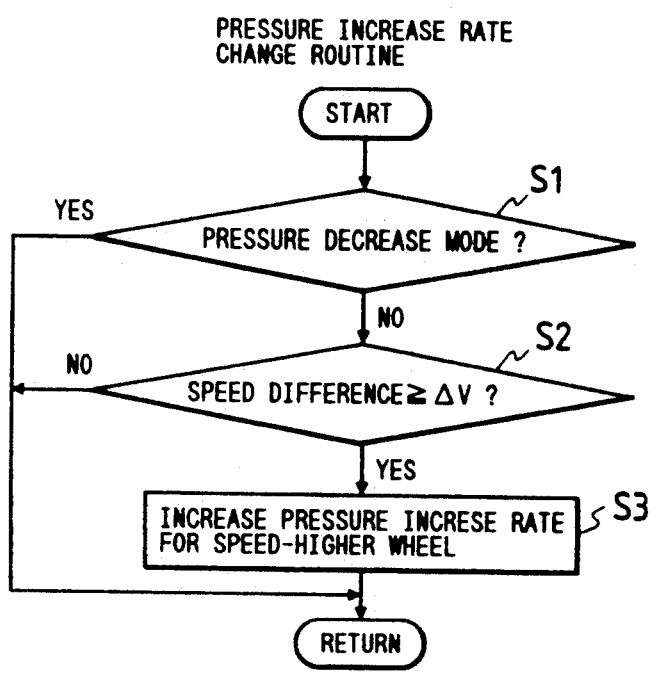
FIG. 5 is a flow chart of the pressure increase rate change routine of the control.

FIG. 5 is a flow chart showing the pressure increase rate change routine of the anti-lock control, which is for the rear wheels of the vehicle. The routine is described with reference to FIGS. 3 and 5 from now on, assuming that the wheel speeds Vw3 of the left rear wheel is higher than that Vw4 of the right rear wheel. In step S1 shown in FIG. 5, it is determined whether the rear wheel control channel is in a pressure decrease mode. If the result of the determination in the step S1 is "NO", namely, the rear wheel control channel is determined to be in a pressure increase mode or a pressure holding mode, it is determined in step S2 whether the difference Vw3−Vw4 between the wheel speeds Vw3 and Vw4 of the left and the right rear wheels is not less than the prescribed value ΔV. If the anti-lock control is at a time point D shown in FIG. 3, namely, the rear wheel control channel is not in the pressure decrease mode, and the difference Vw3−Vw4 is not less than the prescribed value ΔV, step S3 is taken. In the step S3, a pressure increase rate is determined for the left rear wheel on the basis of the pressure increase rate augmentation map of the independent pressure increase determination means 18, which has pressure increase rates larger in pressure increase gradient than those of the control map of the control unit 8, so that the brake hydraulic pressure is increased in a sharp pressure increase mode from the time point D. The pressure increase rate change routine is thus executed to relatively sharply increase the brake hydraulic pressure for the left rear wheel to reduce the difference between the speeds of the left and the right rear wheels, which has been not less than the prescribed value ΔV. When the difference is reduced to be less than the prescribed value ΔV at a time point E shown in FIG. 3, the anti-lock control is returned into a normal pressure increase mode based on the control map of the control unit 8. If the difference has become equal to or more than the prescribed value ΔV at a time point F during the increase in the brake hydraulic pressure in the normal pressure increase mode, the anti-lock control is put back into the sharp pressure increase mode based on the pressure increase rate augmentation map of the independent pressure increase determination means 18.

The present invention is not confined to the embodiment described above, but may be embodied or practiced in other various ways without departing from the spirit or essential character of the invention.

What is claimed is:

1. An anti-lock control apparatus for an automotive vehicle, in which a speed selection means for selecting a lower wheel speed and a higher wheel speed of a right wheel and a left wheel of said automotive vehicle is provided, and a brake hydraulic pressure for said right wheel and said left wheel is controlled to be increased and decreased based on selected wheel with said lower wheel speed through a common control channel, said apparatus comprising:

means for calculating a speed difference between said right wheel and said left wheel; and means for changing a rate of increase in said brake hydraulic pressure for a higher rate with respect to selected wheel with said higher wheel speed when said speed difference is not less than a prescribed value (ΔV) and said common control channel is not in a pressure decrease mode.

2. The apparatus according to claim 1, wherein said rate of increase in said brake hydraulic pressure is defined by a time period in which said brake hydraulic pressure is increased and a respective time period in which said brake hydraulic pressure is held constant.

3. The apparatus according to claim 1, further comprising:

first map means for determining said rate of increase in said brake hydraulic pressure for said right wheel and said left wheel on the basis of selected wheel with said lower wheel speed; and second map means for determining said higher rate on the basis of selected wheel with said lower wheel speed.

4. The apparatus according to claim 1, further comprising:

means for returning said higher rate into an initial rate when said speed difference becomes less than said prescribed value (ΔV).

5. A three-channel anti-lock control apparatus for preventing locking of wheels of a vehicle during braking thereof, wherein a speed of a left front wheel (Vw1) and a right front wheel (Vw2) of said vehicle are handled as a first system speed (Vs1) and a second system speed (Vs2), respectfully, and a left rear wheel (Vw3) and a right rear wheel (Vw4) with a lower wheel speed is selected as a third system speed (Vs3), so that a brake hydraulic pressure for the left front wheel, for the right front wheel and for the left and right rear wheels are controlled independently from each other through a first brake control channel, a second brake control channel and a third brake control channel by setting one of a pressure increase status, a pressure hold status and a pressure decrease status based on said first system speed, said second system speed and said third system speed, said apparatus comprising:

means for calculating a speed difference between said wheel speed of said left rear wheel (Vw3) and said right rear wheel (Vw4) and providing a first signal when said difference is equal to or greater than a predetermined value ($\Delta V$);

means for determining whether said pressure decrease status is set for said third brake control channel and providing a second signal when said pressure decrease status is not set for said third control channel;

means for providing a control signal to effectuate control of said brake hydraulic pressure of said left rear wheel and right rear wheel, whichever has a higher speed, in response to said first signal and second signal.

6. The apparatus according to claim 5, further comprising:

first map means for defining said pressure increase status with a first pressure increase rate, said pressure hold status, and said pressure decrease status with a pressure decrease rate for the control of the brake hydraulic pressure through said first brake control channel, second brake control channel, and third brake control channel; and second map means for defining a second pressure increase rate higher than said first pressure increase rate in response to said first signal and said second signal for the control of the brake hydraulic pressure only for said one of said right rear wheel and said left rear wheel.

7. An anti-lock control method for preventing locking of a vehicle wheels during braking, in which a lower speed selection means for selecting a wheel of said vehicle with a lower wheel speed is provided, and a brake hydraulic pressure for a right wheel and a left wheel is controlled to be increased and decreased by setting one of a pressure increase status, a pressure hold status and a pressure decrease status based on selected said wheel with said lower wheel speed through a common control channel, said method comprising the steps of:

determining whether said common control channel is in said pressure decrease status; calculating a speed difference between said right wheel and said left wheel;

determining whether said speed difference is not less than a predetermined speed value ($\Delta V$); and increasing a pressure increase rate of said right wheel and said left wheel, whichever has a higher speed, in a case where said common control channel is not in said pressure decrease status and said speed difference is not less than said predetermined speed value ($\Delta V$).

* * * * *